United States Patent [19]

Genjiro

[11] Patent Number: 4,636,002
[45] Date of Patent: Jan. 13, 1987

[54] VEHICLE SEAT
[75] Inventor: Takagi Genjiro, Askishima, Japan
[73] Assignee: Tachikawa Spring Co., Ltd., Akishima, Japan
[21] Appl. No.: 761,525
[22] Filed: Aug. 1, 1985
[30] Foreign Application Priority Data
  Aug. 28, 1984 [JP] Japan .................. 59-178956
[51] Int. Cl.[4] .................. B60N 1/02; A47C 1/032
[52] U.S. Cl. .................. 297/319; 297/83;
  297/284; 297/321; 297/458
[58] Field of Search ............ 297/319, 316, 320, 321,
  297/284, 460, 458, 322, 311, 83

[56] References Cited
U.S. PATENT DOCUMENTS

| | | | |
|---|---|---|---|
| 847,880 | 3/1907 | Baker et al. | 297/319 |
| 3,005,660 | 10/1961 | Winick | 297/319 X |
| 3,146,023 | 8/1964 | Lorenz | 297/320 X |
| 3,550,953 | 12/1970 | Neale | 297/284 X |
| 4,334,709 | 6/1982 | Akiyama et al. | 297/284 |
| 4,410,213 | 10/1983 | Samson | 297/319 X |
| 4,558,903 | 12/1985 | Takagi | 297/284 X |

Primary Examiner—William E. Lyddane
Assistant Examiner—Mark W. Binder
Attorney, Agent, or Firm—Cushman, Darby & Cushman

[57] ABSTRACT

A vehicle seat such as an automotive seat is disclosed in which the rearward portion of a cushion frame is attached to a vehicle floor by shaft pins so that the forward portion of the cushion frame can be raised up and lowered down by link members. These link members are attached to a connecting bar for connecting these link members with a back frame. In this vehicle seat, when the back frame is reclined relative to the cushion frame, then the link members are rotated forwardly by the connecting bar so that the forward portion of the cushion frame in engagement with the respective central portions of the link members can be raised up about its pivotally mounted portion in the rearward portion thereof, that is, about the shaft pins.

2 Claims, 7 Drawing Figures

VEHICLE SEAT

BACKGROUND OF THE INVENTION

1. Field of the Invention

The present invention relates to a seat for use in a vehicle such as an automobile and, in particular, to such seat which enables the forward portion of a seat cushion to be sloped upwardly in link with the reclining operation of a seat back.

2. Description of the Prior Art

In recent years, for a seat to be used in a vehicle such as an automobile, there has been proposed a seat of the type which enables the forward portion of a seat cushion to be sloped upwardly in link with the reclining operation of a seat back so that the thigh portions of an occupant of the seat can be supported easily.

An example of this type of seat is one disclosed in Japanese Patent Publication No. 36732 of 1983. Specifically, this prior art seat is provided with lifting means and longitudinally moving means respectively located in its forward and rearward portions between the seat cushion and a vehicle body, whereby the entire seat cushion is moved forwardly by the longitudinal moving means with the reclining operation of the seat back, and at the same time the forward portion of the seat cushion is raised up by the lifting means.

In the above-mentioned vehicle seat, however, there are found some problems to be solved. That is, the forward movement of the entire seat cushion with the seat back reclining operation produces a great clearance between the lower end portions of the seat back and the rear end portions of the seat cushion, which causes the so-called "back slip" in the back portions of the occupant to turn up the clothes of the occupant, or makes the sitting position of the occupant unstable.

SUMMARY OF THE INVENTION

The present invention aims at eliminating the drawbacks found in the above-mentioned prior art vehicle seat.

Accordingly, it is a primary object of the invention to provide a vehicle seat which enables the forward portion of a seat cushion to be sloped upward with the reclining operation of a seat back without producing any clearance between the seat cushion and the seat back so as to provide a comfortable sitting feeling.

In achieving the above object, according to the invention, the rearward portions of a cushion frame are rotatably mounted to the floor of the vehicle by means of shaft pins so that the forward portions of the cushion frame can be raised and lowered. Between the cushion frame forward portions and the floor, there are provided link members which raise or lower the cushion frame. The link members and a back frame are interconnected with each other by means of a connecting bar (18), whereby, when the back frame (2) is reclined with respect to the cushion frame (1), then the link members (10) are rotated forwardly by means of the connecting bar (18) and thus the forward portions of the cushion frame (1) being engaged with the central portions of the link members (10) are raised up about the pivotally mounted portions located in the rearward portions thereof, i.e., the shaft pins (8), so that the femoral or thigh portions of the occupant can be supported in a comfortable manner.

Other objects and advantages of the invention will become apparent from the following description of embodiments with reference to the accompanying drawings.

DETAILED DESCRIPTION OF PREFERRED EMBODIMENTS OF THE INVENTION

Figure 1:
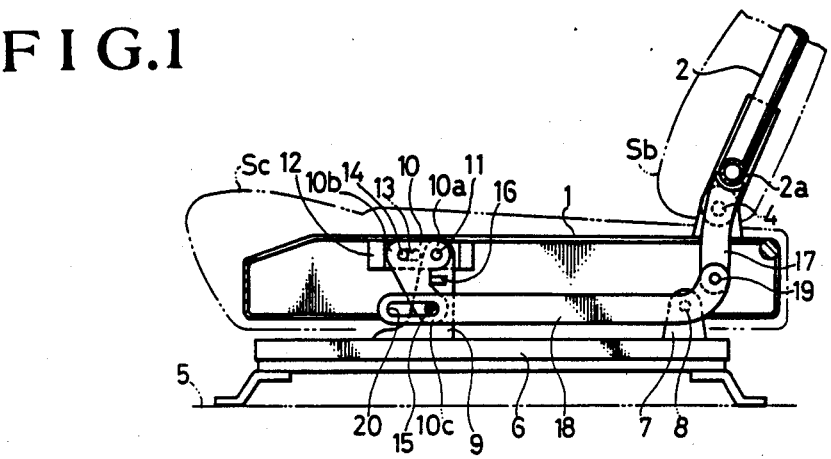
FIG. 1 is a longitudinally sectional side view of a first embodiment of the invention.
Figure 2:
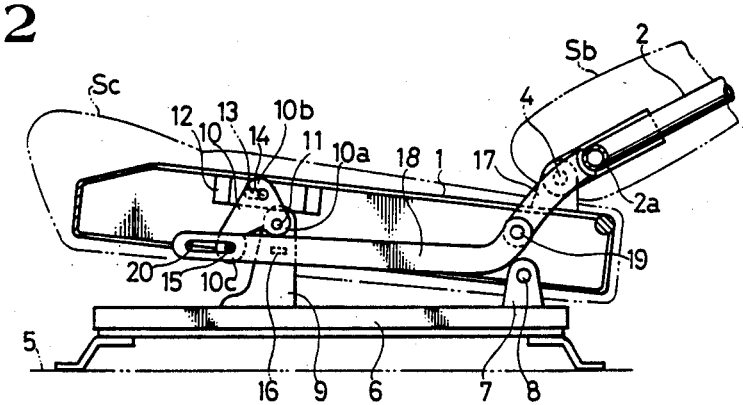
FIG. 2 is an exploded perspective view of the same.
Figure 3:
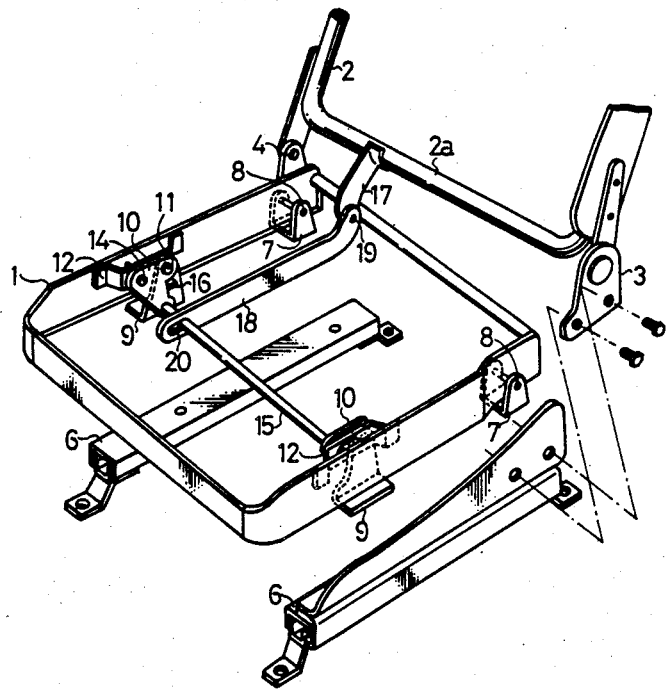
FIG. 3 is a longitudinally sectional side view of the same, illustrating its condition during the reclining operation.

Referring first to FIGS. 1-3, there is illustrated a first embodiment of the invention. A cushion frame (1) and a back frame (2) are interlocked in a longitudinally rotatable manner by means of a reclining device (3) and a free hinge (4).

The cushion frame (1) is mounted in the rearward portions of both sides thereof via shaft pins (8) (8) to rear support brackets (7) (7) which are respectively provided in the rear portions of the upper surfaces of the right and left slide rails (6) (6) fixed to a floor (5) in such a manner that it can be raised and lowered.

Also, in the upper-surface forward portions of the slide rails (6) there are vertically provided front support brackets (9) (9), respectively, and in the upper end portions of the front support brackets (9) (9), there are provided doglegshaped link members (10) (10) such that they can be longitudinally rotated in their respective first ends (10a) (10a) by means of shaft pins (11), respectively. Corresponding to these dogleg-shaped link members (10) (10), brackets (12) (12) are fixedly secured to the interiors of the two sides in the front half section of the cushion frame (1). The brackets (12) (12) are respectively formed with longitudinally extending elongated bores (13) (13) with which are engaged engagement pins (14) (14) that are planted in the central portions (10b) (10b) of the doglegged link members (10) (10) and are faced outwardly. Between the second ends (10c) (10c) of the doglegged link members (10) (10), there is extended a rod (15) which allows the two link members (10) (10) to be interlocked with each other for simultaneous rotation.

The dogleg-shaped link members (10) (10) are respectively abutted against the front support brackets (9) (9) such that the cushion frame (1) lies substantially horizontal to the floor (5), as described later. There are provided stoppers (16) (16) to prevent the rearward rotation of the link members (10) (10), respectively.

On the other hand, to the lower side portion (2a) of the back frame (2), there is fixed an arm (17) which is extended downwardly of the hinge portion of the back frame (2) with respect to the cushion frame (1), to the lower end of which arm (17) is connected a connecting bar (18) at its rear end by means of a pin (19). The front end portion of the connecting bar (18) is engaged, at its elongated bore (20) of a predetermined length formed in its longitudinal direction, with The rod (15) extended across the doglegged link members (10) (10).

The cushion frame (1) and back frame (2) are covered with seat pads and trim cover assemblies, respectively, to form a seat cushion Sc and a seat back Sb.

Next, we will describe the operation of the thus-constructed embodiment of the invention.

As shown in FIG. 1, when the back frame (2) lies in its neutral position, the cushion frame (1) stands substantially horizontal with respect to the floor (5). In this condition, since the doglegged link members (10) (10) are respectively abutted against the stopper (16) (16) of the front support brackets (9) (9) and are prevented against rearward rotation, the cushion frame (1) is maintained in its horizontal position.

When the back frame (2) is inclined rearwardly by the reclining device (3) from its above position, then the connecting bar (18), which is connected to the arm (17) fixed to the back frame (2), is pushed out forwardly and the rear edges of the elongated bore (20) formed in the front end portion of the connecting bar (18) press against the rod (15) in a forward direction, so that the doglegged link members (10) (10) are respectively rotated forwardly about the shaft pins (11) (11). As a result of this rotation, the cushion frame (1) in engagement with the engagement pins (14) (14) in their central portions (10b) (10b) is sloped high in its forward portion with the shaft pins (8) (8) of the rear support brackets (7) (7) acting as its fulcra (see FIG. 3).

On the contrary, when the back frame (2) is rotated forwardly from the last-mentioned position to return to its neutral position, then the connecting bar (18) is moved backwardly to cause the doglegged link members (10) (10) to be rotated backwardly due to the weight of the seat or due to the load of the occupant. As a result of this movement, the forward portion of the cushion frame (1) is lowered down to take its original position, that is, the cushion frame (1) is set again in a horizontal condition relative to the floor (5).

Accordingly, according to the above-mentioned embodiment of the invention, with the reclining operation of the seat back Sb, the forward portion of the seat cushion Sc is sloped higher so that the femoral portions of the occupant can be supported in a comfortable manner to provide a stable sitting position for the occupant.

Figure 4:
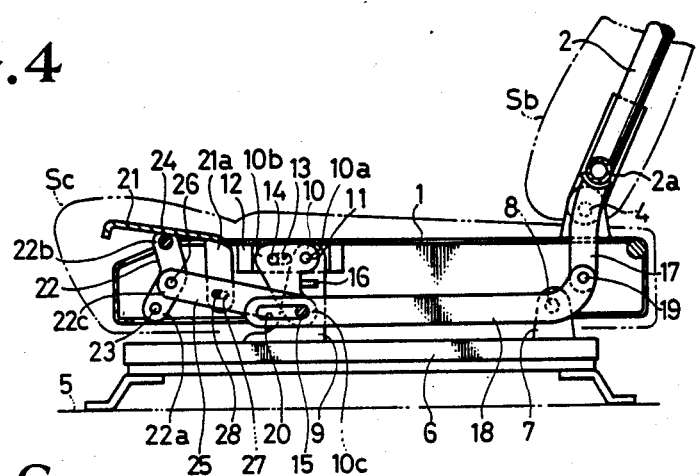
FIG. 4 is a longitudinally sectional side view of a second embodiment of the invention.
Figure 6:
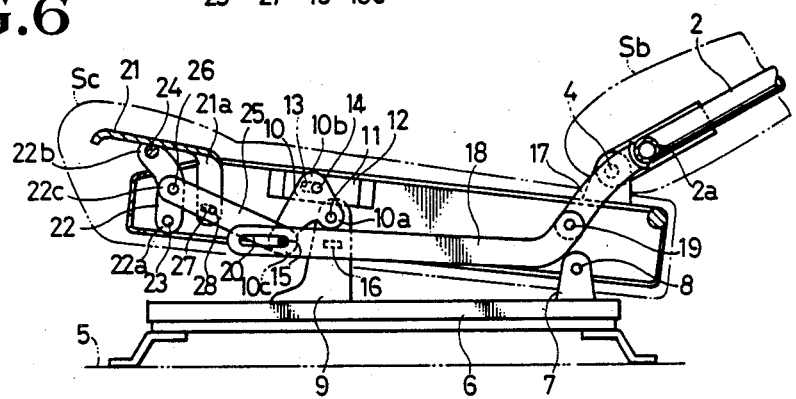
FIG. 6 is a longitudinally sectional side view of the same, illustrating its condition during the reclining operation; and, FIG. 7 is a longitudinally sectional side view of the invention, illustrating its condition when a seat back is caused to fall down forwardly.
Figure 5:
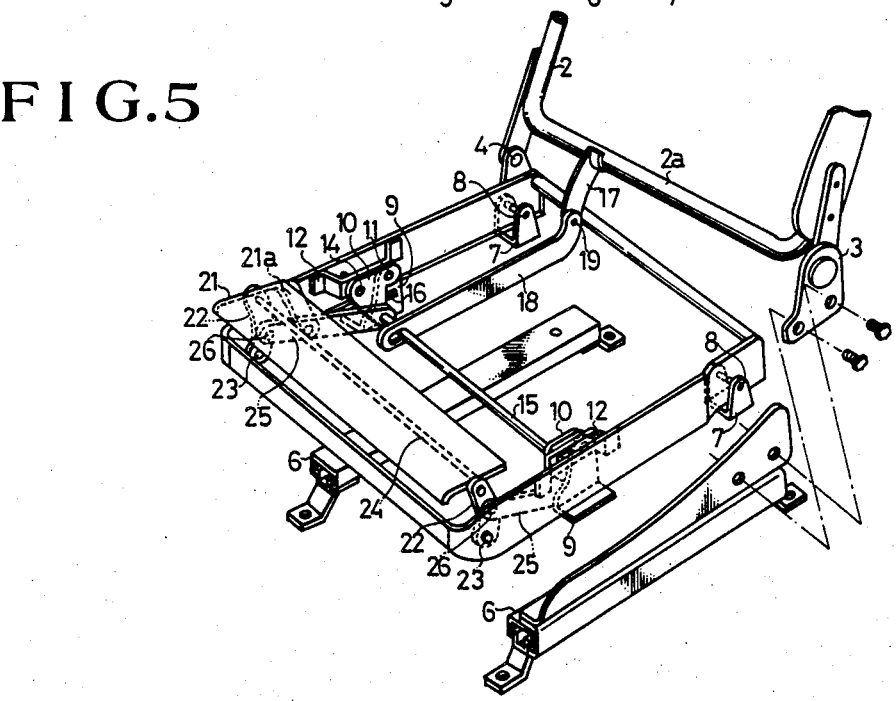
FIG. 5 is an exploded perspective view of the same.

Referring now to FIGS. 4–6, there is illustrated a second embodiment of the invention in which, in addition to the structure of the first embodiment, a plate-like thigh support frame (21) is provided on the front upper surface of the cushion frame (1), and, below the thigh support frame (21), a pair of reversedly doglegged link members (22) (22) serving as the second link members are respectively mounted in their respective first end portions (22a) (22a) to the inner surface sides of the two side sections of the cushion frame (1) through shaft pins (23) (23) in a longitudinally rotatable manner, with a rod (24) being journalled between the respective second end portions (22b) (22b) and being fixed to the inside of the thigh support frame (21). To the central portions (22c) (22c) of the reversedly doglegged link members (22) (22), there are connected second connecting bars (25) (25) having respective front end portions connected to the central portions (22c) (22c) by means of connecting pins (26) (26) and respective rear end portions being connected to the rod (15) extended across the reverseddogleg link members (10) (10).

Also, the thigh support frame (21) is provided at its one end with a suspension piece (21a). This suspension piece (21a) is formed in its lower portion with a longitudinally extending elongated bore (27) into which is engaged an engagement pin (28) that is planted in the second connecting bar (25).

In this embodiment, although not shown, in order that only the forward portion of the seat cushion Sc in which the thigh support frame (21) is disposed can be expanded and contracted back and forth, the seat pad is formed with split slots and the corresponding portions of the trim cover assembly are so formed as to be elastic.

Next, we will describe the operation of the thus-constructed seat of the invention.

When the back frame (2) is incliningly moved in a backward direction similarly to the before-described first embodiment, then the doglegged link members (10) (10) are rotated through the connecting bar (18) to slope the forward portion of the cushion frame (1) in its higher level. With the rotation of the doglegged link members (10) (10), the reversedly-doglegged link members (22) (22) which are respectively interlocked with the link members (10) (10) via the connecting bars (25) (25) are respectively rotated forwardly about the shaft pins (23) (23), so that the thigh support frame (21) interlocked with the second end portions (22b) (22b) of the reversedogleg link members (22) (22) is moved forwardly. As a result of this motion, the forward portion of the seat cushion Sc is pushed out forwardly to provide a long sitting surface (see FIG. 6).

On the contrary, when the back frame (2) is returned to its neutral postion from such condition, then the connecting bar (18) is retreated and the link members (10) (10) are rotated backwardly, causing the forward portion of the cushion frame (2) to be lowered. Together with the backward rotation of the link members (10) (10), the reversedly doglegged link members (22) (22) interlocked via the connecting bars (25) (25) with the link members (10) (10) are rotated to move the thigh support frame (21) backwardly, so that the forward portion of the seat cushion Sc is pulled in to set an ordinary length.

In this way, according to the second embodiment of the invention, in linking with the reclining operation of the seat back Sb, the seat cushion Sc forward portion is raised up and pushed out forwardly, so that the occupant allows his or her thigh portions to be supported more comfortably and can take a stabler sitting attitude.

Figure 7:
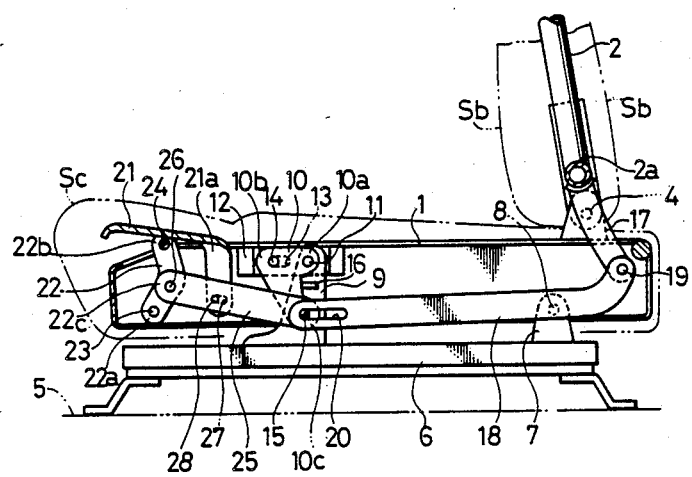

Further, in the above-mentioned first and second embodiments of the invention, the seat back Sb can also be inclined down forwardly from its neutral position. In other words, because the forward portion of the connecting bar (18) is engaged through the elongated bore (20) with the rod (15) extended across the two link members (10) (10), the back frame (2) can be rotated backwardly and forwardly during such a condition that the doglegged link members (10) (10) are abutted against the stopper members (16) (16) within the range of the sliding movements of the elongated bore (20) with respect to the rod (15) and remains immovable, that is, while the cushion frame (1) is lying horizontal with respect to the floor (5), (see FIG. 7). Therefore, by changing the length of the elongated bore (20) in the connecting bar (18), it is possible to set an angle of forward inclination for the seat back Sb in an arbitrary manner.

When such seat back Sb capable of forward inclination is applied to the front seat of a so-called 2-door car, the occupant in the rear seat of the car can get in and out of the car smoothly.

As described hereinbefore, according to the invention, in link with the reclining operation of the seat back, the forward portion of the seat cushion is raised up into its higher position, so that the thigh portions of the occupant can be supported in a comfortable manner to provide a generally relaxed sitting position to the occupant. In this operation, since the seat cushion is pivotally attached in its rearward portion to the floor, the seat cushion is sloped with this rearward, pivotal portion acting as its fulcrum, which eliminates the possibility of widening the clearance between the seat back and the seat cushion. Therefore, no slip can be produced in the back portion of the occupant and thus the occupant is always able to take a comfortable sitting attitude.

What is claimed is:

1. A vehicle seat comprising:
   a cushion frame having a pair of brackets fixed at a forward portion thereof such that one of said brackets is disposed at one lateral section of said cushion frame while the other of said brackets is disposed at the other opposed lateral section of said cushion frame, said brackets each being formed with a bore therethrough;
   a pair of rear support brackets fixed to a rear end portion of said cushion frame and being adapted for pivotally supporting respective rearward parts of said lateral sections of said cushion frame so that the forward portion of said cushion frame can be raised up and lowered down;
   a pair of front support brackets fixed at respective forward parts of said lateral sections of said cushion frame;
   a back frame interlocked to the rear end portion of said cushion frame in such a manner as to be rotatable forwardly and rearwardly relative to said cushion frame;
   a pair of substantially V-shaped link members each having a first upper end, a central portion and a second lower end formed therewith, the arrangement of said substantially V-shaped link members being such that each of said first upper ends is pivotally connected to one of said pair of front support brackets, each of said central portions has an engagement pin slidably engaged in each of said bores of said brackets of said cushion frame, and each of said second lower ends is so formed as to extend downwardly from each of said substantially V-shaped link members;
   a stopper formed on each of said pair of front support brackets, said stopper being adapted to prevent rearward rotation of each of said substantially V-shaped link members;
   a rod extending between said pair of substantially V-shaped link members such that both ends of said rod are respectively connected to said second lower ends of said pair of substantially V-shaped link members;
   an arm fixed to a lower part of said back frame, said arm extending downwardly and terminating in a free end portion; and
   a connecting bar having an elongated bore formed at a forward end portion thereof, said connecting bar extending between said rod and said arm in such a manner that said elongated bore of said connecting bar slidably receives said rod and a rearward end portion of said connecting bar is pivotally connected to said free end portion of said arm.

2. A vehicle seat comprising:
   a cushion frame having a pair of brackets fixed at a forward portion thereof such that one of said brackets is disposed at one lateral section of said cushion frame while the other of said brackets is disposed at the other opposed lateral section of said cushion frame, said brackets each being formed with a bore therethrough;
   a pair of rear support brackets fixed to a rear end portion of said cushion frame and being adapted for pivotally supporting respective rearward parts of said lateral sections of said cushion frame so that the forward portion of said cushion frame can be raised up and lowered down;
   a pair of front support brackets fixed at respective forward parts of said lateral sections of said cushion frame;
   a back frame interlocked to the rear end portion of said cushion frame in such a manner as to be rotatable forwardly and rearwardly relative to said cushion frame;
   a pair of first link members each being of substantially V-shaped configuration and having a first upper end, a central portion and a second lower end formed therewith, the arrangement of said first link members being such that each of said first upper ends is pivotally connected to one of said pair of front support brackets, each of said central portions has an engagement pin slidably engaged in said bore of said bracket of said cushion frame, and each of said second lower ends is so formed as to extend downwardly from each of said first link members;
   a stopper formed on each of said pair of front support brackets, said stopper being adapted to prevent rearward rotation of said first link members;
   a rod extending between said pair of first link members such that both ends of said rod are respectively connected to said second lower ends of said pair of first link members;
   an arm fixed to a lower part of said back frame, said arm extending downwardly and terminating in a free end portion;
   a first connecting bar having an elongated bore formed at a forward end portion thereof, said first connecting bar extending between said rod and said arm in such a manner that said elongated bore of said first connecting bar slidably receives said rod and a rearward end portion of said first connecting bar is pivotally connected to said free end portion of said arm;
   a thigh support frame disposed on an upper surface of the forward portion of said cushion frame, said thigh support frame having a suspension piece extending downwardly from one end thereof with an elongated bore in said one end;
   a pair of second link members each being of substantially reversed V-shaped configuration relative to said pair of first link members and further being disposed below respective lateral ends of said thigh support frame, each of said second link members having a first upper end, a central portion and a second lower end, the arrangement of said second link members being such that each of said first upper ends is pivotally connected to each of said respective lateral ends of said thigh support frame and each of said second lower ends is pivotally connected to the forward portion of said cushion frame; and a pair of second connecting bars, each of which is at one end thereof pivotally connected to said rod and is at another end thereof pivotally connected to said central portion of one of said pair of second link members, one of said pair of second connecting bars having an engagement pin which is slidably engaged in said elongated bore of said suspension piece of said thigh support frame;

whereby, when said back frame is inclined rearwardly relative to said cushion frame, said arm is moved forwardly to push said first connecting bar, simultaneously pushing said rod, thereby causing said pair of first link members to rotate to raise up the forward portion of said cushion frame, and at the same time, said pair of second connecting bars is moved forwardly to cause said pair of second link members to rotate forwardly, thereby causing forward movement of said thigh support frame with respect to said cushion frame with the result that said thigh support frame is projected forwardly and upwardly from said forward portion of said cushion frame.

* * * * *

UNITED STATES PATENT AND TRADEMARK OFFICE
CERTIFICATE OF CORRECTION

PATENT NO. : 4,636,002

DATED : January 13, 1987

INVENTOR(S) : Genjiro Takagi

It is certified that error appears in the above-identified patent and that said Letters Patent is hereby corrected as shown below:

Last name is listed as first on grant.
Inventor's first name is Genjiro, last name is TAKAGI.

Signed and Sealed this

Fifteenth Day of September, 1987

Attest:

DONALD J. QUIGG

Attesting Officer

Commissioner of Patents and Trademarks